United States Patent Office 2,983,774
Patented May 9, 1961

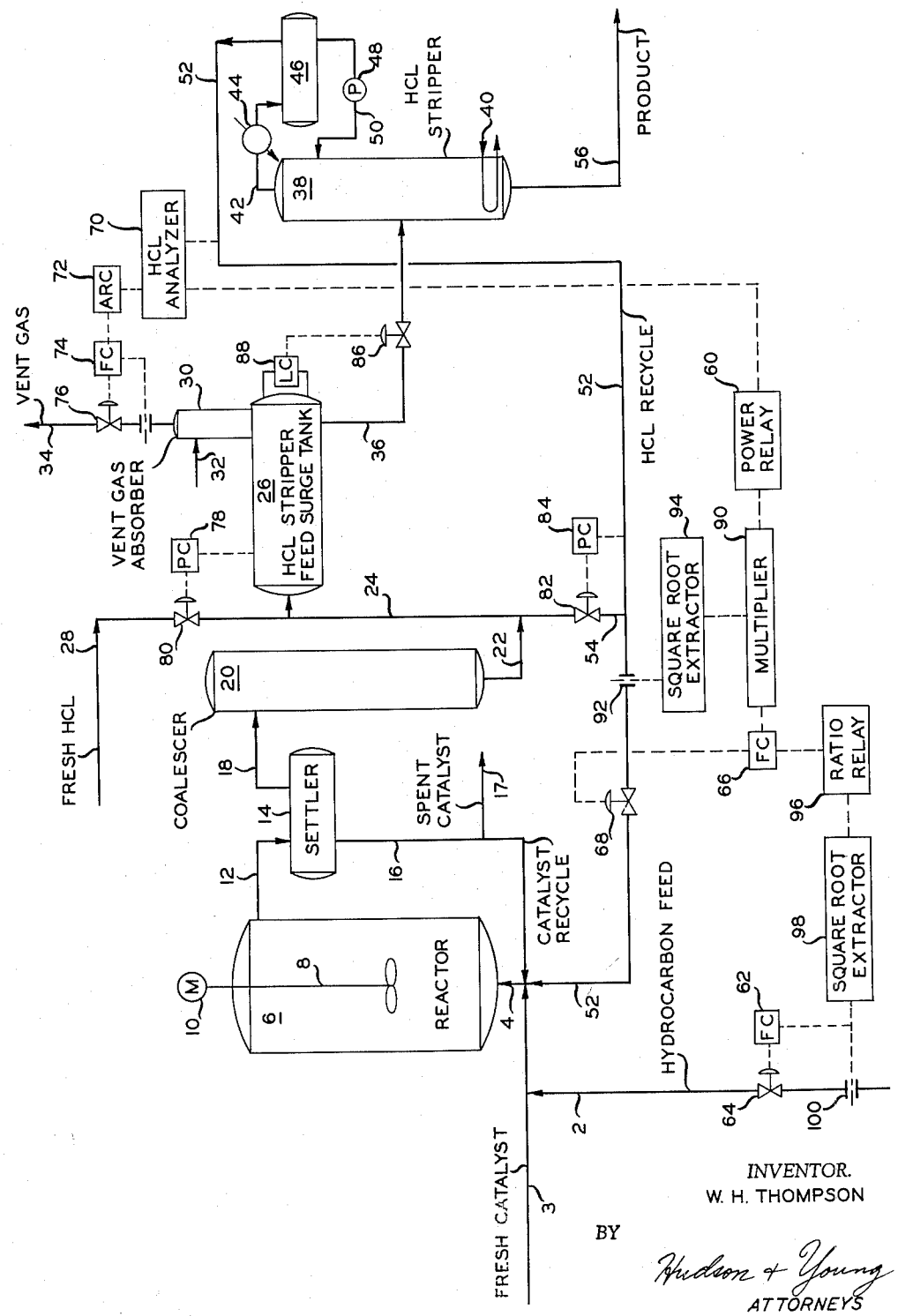

2,983,774

CONTROL OF HYDROGEN HALIDE CONCENTRATION IN THE ISOMERIZATION OF HYDROCARBONS

William H. Thompson, Bartlesville, Okla., assignor to Phillips Petroleum Company, a corporation of Delaware Filed July 15, 1959, Ser. No. 827,286

14 Claims. (Cl. 260—683.74)

This invention relates to improved process and apparatus for the isomerization of hydrocarbons. In one aspect it relates to improved process and apparatus for controlling hydrogen halide concentration in the isomerization of normal acyclic and alkyl-substituted alicyclic hydrocarbons utilizing a metal halide and hydrogen halide.

Various hydrocarbon fractions of petroleum contain large amounts of naphthenic compounds and normal paraffins. Many of these compounds are relatively useless in their original form; however, they can be converted to valuable materials which are useful in motor fuels or as starting materials in chemical processes. Thus, for example, n-hexane which has a low octane number can be converted to isohexanes which have high octane numbers and form valuable components of motor fuels. Also, compounds such as methylcyclopentane can be converted to cyclohexane which is a starting material in the manufacture of nylon fibers. In one well known method normal paraffins and naphthenes are isomerized in the presence of a metal halide catalyst and a hydrogen halide, for example, aluminum chloride and hydrogen chloride. The proportion of hydrogen halide present in the reaction system has a susbtantial effect on the isomerization reaction, therefore it is desirable that this material be controlled to provide a substantially constant concentration of hydrogen halide relative to the fresh hydrocarbon feed.

It is an object of this invention to provide improved process and apparatus for the isomerization of hydrocarbons.

Another object of this invention is to provide improved process and apparatus for controlling the concentration of hydrogen halide in the isomerization of hydrocarbons with a metal halide catalyst and hydrogen halide.

Another object of this invention is to provide improved process and apparatus for maintaining a substantially constant ratio of hydrogen halide to hydrocarbon feed reactant in the isomerization of normal acyclic and alkyl-substituted alicyclic hydrocarbons with a metal halide catalyst and hydrogen halide.

These and other objects of the invention will become more readily apparent from the following detailed description and discussion.

In the usual isomerization reaction hydrocarbon reactants are contacted in a reaction zone with metal halide catalyst in the presence of hydrogen halide and under suitable conditions to effect the isomerization reaction. Effluent from the reaction is passed to a settler wherein separation of the major proportion of catalyst is effected, the catalyst normally being recycled to the reactor. The hydrocarbon portion of the reaction effluent is then further processed to remove residual catalyst after which it is introduced to a surge vessel, which serves as a feed tank for a hydrogen halide stripper, wherein hydrogen halide and lighter materials are separated from the effluent. The bottoms product from the hydrogen halide stripper comprises the desired isomerizate which can be processed further, for example, by separation into additional fractions. The overhead from the hydrogen halide stripper comprises lighter hydrocarbons, non-condensable gases, etc., and hydrogen halide. This stream is normally recycled to the reatcion zone to provide reuse of the hydrogen halide contained therein. Inasmuch as non-condensables tend to accumulate in the system provision is ordinarily made to periodically vent these materials from an appropriate point in the system, for example, from the surge zone containing the feed to the hydrogen halide stripping zone. To replace hydrogen halide which is lost from the system in the vent gases and from other causes, for example, leaks from process equipment, it has been the practice to periodically add fresh hydrogen halide to the system. While the previous methods of operation have been effective in controlling the concentration of non-condensables it has been found that the hydrogen halide concentration within the reaction system tends to vary which makes it very difficult and often impossible to maintain the desired ratio of hydrogen halide-to-hydrocarbon feed entering the reaction zone.

In the method of this invention the concentration of hydrogen halide in the reaction system is maintained substantially constant and loss of hydrogen halide from said system is substantially reduced by the process which comprises measuring the concentration of hydrogen halide in the gaseous material recycled to the isomerization reaction and varying the rate at which non-condensable gases are vented from the surge zone in inverse proportion to and in response to variations in said concentration, measuring the pressure in the surge zone and varying the quantity of fresh hydrogen halide introduced to the process inversely in proportion to and in response to variations in said pressure, measuring the flow rate of hydrocarbon reactant to the isomerization reaction and the flow rate of gaseous material containing hydrogen halide to the isomerization reaction, and varying the latter flow rate in inverse proportion to and in response to variations in the hydrogen halide concentration in said gaseous material and in direct proportion to and in response to variations in the rate of feed of hydrocarbon reactant to the isomerization reaction.

The process of this invention is applicable in general to the conversion of hydrocarbons by isomerization. A wide variety of hydrocarbons can be converted in the isomerization reaction, for example, straight chain paraffins such as butane, pentane, hexane, heptane and higher molecular weight compounds can be converted to various isomers. Also, moderately branched paraffins can be converted to more highly branched materials, thus, 2-methylpentane can be isomerized to 2,2-dimethylbutane. It is also possible to isomerize naphthenic hydrocarbons having 5, 6, 7 and more carbon atoms in the rings. Examples include the isomerization of methylcyclopentane to cyclohexane, 1,1-dimethylcyclobutane to methylcyclopentane, 2-dimethylcyclopentane to methylcyclohexane, and the like. The isomerization reaction is usually carried out at a temperature between about 25° C. and about 400° C. at pressures from 1 atmosphere to 1000 p.s.i. or higher and at liquid hourly space velocities from about 0.1 to about 20.

The catalysts employed in carrying out isomerization comprise metal halides such as aluminum chloride, aluminum bromide, boron trifluoride, and the halides of metals such as zinc, tin, arsenic, antimony, zirconium, beryllium, titanium, iron and the like. The catalysts are especially effective when present as complexes which are formed by interaction between the metal halides and hydrocarbons present in the reaction system. A particularly desirable reaction catalyst is the complex of hydrocarbons with aluminum chloride.

The following discussion will be directed primarily to the isomerization of a feed mixture comprising normal hexane and methylcyclopentane in the presence of aluminum chloride. This is not intended, however, in any limiting sense and it is within the scope of the invention to isomerize hydrocarbons in general using catalysts selected from those hereinbefore set forth. The isomerization of normal acyclic and alkyl-substituted alicyclic hydrocarbons such as normal hexane and methylcyclopentane is carried out usually at a temperature in the range of about 90° F. to about 160° F. The reaction is preferably effected under sufficient pressure to provide a liquid phase reaction, namely, a pressure in the range of between about 150 and about 300 p.s.i.g. The contact or residence time of the reactants in the reaction zone varies but is usually between about 0.1 and about 5 hours. In addition to the catalyst it is desirable that the corresponding hydrogen halide be present in the reaction zone since this material maintains catalyst activity at a high level. The amount of hydrogen chloride present is usually between about 2 and about 6 percent by weight based on the hydrocarbon reactant with about 4 percent by weight being preferred. The hydrocarbon-to-catalyst ratio is also an important factor in the isomerization reaction and this ratio is generally maintained between about 0.8:1 and about 1.4:1, although ratios as high as 5:1 can be used if reaction temperatures are increased.

The invention is best described by reference to the accompanying drawing which is a diagrammatic illustration in cross-section of an isomerzation unit including an instrumentation system suitable for carrying out the invention.

Referring to the drawing, a feed material comprising a mixture of normal hexane, methylcyclopentane and containing some cyclohexane and isohexanes is introduced to reactor 6 through conduits 2 and 4. Prior to entering the reactor the feed is combined with recycle gases containing hydrogen chloride through conduit 52. Simultaneous with the entrance of feed and hydrogen chloride to the reactor fresh aluminum chloride catalyst is introduced thereto through conduits 3 and 4. The principal reaction which takes place in reactor 6 is the isomerization of normal hexane to 2-methylpentane and methylcyclopentane to cyclohexane. In addition three other isomers of normal hexane, namely, neohexane, diisopropyl and 3-methylpentane are also formed in varying quantities. During the course of the reaction, the contents of the reactor are maintained in an agitated state by stirrer 8 which is driven by a motor 10.

Effluent from the reactor comprising unreacted normal hexane, methylcyclopentane, cyclohexane and the various isohexanes is passed through conduit 12 and enters settler 14 wherein entrained catalyst is separated from the hydrocarbon material, the major portion of the settled catalyst being returned to the reactor through conduits 16 and 4. Inasmuch as the catalyst gradually loses its activity, it is desirable that a portion of it be either periodically or continuously withdrawn from the system. For this purpose, a conduit 17 is provided through which spent catalyst can be withdrawn. Although a substantial separation of catalyst and hydrocarbon is effected in settler 14, the hydrocarbon effluent therefrom still contains finely divided aluminum chloride and a major proportion of the hydrogen chloride. This stream is passed through conduit 18 into coalescer 20 for the purpose of effecting removal and recovery of these now undesirable materials. Various inert materials can be used for coalescing the catalyst including sand, charcoal, and the like; however, bauxite is preferred for this purpose. The effluent from the coalescers being substantially free of aluminum chloride catalyst is introduced to hydrogen chloride stripper feed surge tank 26 through conduits 22 and 24. The isomerization reaction effluent usually contains small quantities of light gaseous hydrocarbons. As hereinafter described, these material are normally removed in the hydrogen chloride stripper along with hydrogen chloride; however, since the hydrogen chloride is recycled to the isomerization reactor eventually the light gases build up in the system. To prevent such a buildup, venting of gases is provided through vent gas absorber 30 which is disposed on the stripper feed urge tank. In order to minimize loss of hydrogen chloride in this operation, the vent gas absorber is refluxed through conduit 32 preferably with bottoms from the hydrogen chloride stripper. A portion of the hydrogen chloride in the vent gases is thus absorbed and returned to the stripper feed surge tank with the gases being passed from the system through conduit 34.

Accumulated material in the feed surge tank is removed therefrom through conduit 36 and motor valve 86, which is controlled by liquid-level controller 88 and introduced to hydrogen chloride stripper 38 wherein the major proportion of the hydrogen chloride is separated from the reactor effluent. The overhead product from the stripper is passed through condenser 44 and enters accumulator 46. Liquid is withdrawn from the accumulator and returned to the stripper as reflux through pump 48 and conduit 50. The uncondensed portion of the stripper overhead, which comprises hydrogen chloride and hydrocarbon gases, is returned to the isomerization reactor through conduit 52. As necessary in the operation of the instrumentation system which will be described hereinafter, a portion of the hydrogen chloride containing recycle gas is recycled through conduits 54 and 24 to the hydrogen chloride stripper feed surge tank. The heat required in the stripping operation is provided by reboiler 40 which is disposed in the bottom of stripper 38. The stripper bottoms product comprising principally the heavier hydrocarbon portion of the reactor effluent is removed therefrom through conduit 56 and yielded from the unit. As desired, the latter material can be subjected to further processing to separate the various components thereof. While every effort is made to prevent the loss of hydrogen chloride from the system, a portion of this material escapes with the vent gas and through various leaks in the process system. To replenish the supply of hydrogen chloride in the system, fresh material is introduced to the hydrogen chloride stripper feed surge tank 26 through conduit 28.

An instrumentation system is provided in conjunction with the isomerization unit hereinbefore described, which comprises a hydrogen chloride analyzer 70 which measures the hydrogen chloride content of the hydrogen chloride recycle gas, an anlyzer recorder controller 72 which is adapted to receive a signal from analyzer 70 proportional to the hydrogen chloride content of said recycle gas, a flow recorder controller 74 which is reset by analyzer recorder controller 72 and which controls valve 76 in the vent gas line 34. The pressure on the hydrogen chloride stripper feed surge tank 26 is measured by a pressure recorder controller 78 which controls valve 80 in the fresh hydrogen chloride line conduit 28. The flow of hydrogen chloride recycle gas through conduit 54 is controlled by a valve 82 which is actuated by pressure recorder controller 84 in response to changes in pressure in the hydrogen chloride recycle gas stream. Control of the flow rate of hydrocarbon reactants to the reactor is provided by valve 64 which is actuated by flow recorder controller 62. The quantity of hydrogen chloride recycle gas which is introduced to the reactor is controlled by valve 68 which is actuated by flow recorder controller 66. A ratio computer control system is provided comprising FRC 66, which receives signals from hydrogen chloride analyzer 70, flow orifice 100 and flow orifice 92. The computer system is adapted to multiply the flow rate of the hydrogen chloride recycle gas times the proportion of hydrogen chloride in said gas, ratio the resulting value to the hydrocarbon reactant feed and reset flow recorder controller 66 to provide a constant value of said ratio by suitably varying the quantity of hydrogen chloride recycle gas entering reactor 6.

In the operation of the afore-described instrumentation system, the hydrogen chloride analyzer 70 measures the concentration of hydrogen chloride in the hydrogen chloride recycle gas and transmits a signal proportional to said concentration to analyzer recorder controller 72. This instrument in turn resets flow recorder controller 74 which actuates valve 76. If, for example, the percentage of hydrogen chloride in the recycle gas decreases, this is an indication that non-condensables are building up in the system and must be vented therefrom. As a result, valve 76 is opened to increase the flow of gases through the vent gas absorber. When the flow of gases through the absorber increases, the pressure in the hydrogen chloride stripper feed surge tank is reduced, which actuates pressure recorder controller 78, causing valve 80 to open and introducing fresh hydrogen chloride to the system through conduit 28. The increased flow of fresh hydrogen chloride to the system continues until the pressure in surge tank 26 is returned to the normal operating value. Similarly, the increased flow rate of vent gas continues until the hydrogen chloride content of the hydrogen chloride recycle gas returns to the desired value. As pointed out previously, the ratio computer control system controls the flow of hydrogen chloride recycle gas through conduit 52 to provide a predetermined ratio of hydrogen chloride to hydrocarbon reactant entering the reactor 6. Assuming the same situation as before, namely, a reduction in hydrogen chloride in the hydrogen chloride recycle gas, an electrical signal reflecting this change is transmitted from hydrogen chloride analyzer 70 to power relay 60 which converts the electrical signal to a pneumatic signal. The pneumatic signal is then transmitted to multiplier 90. At the same time, a signal proportional to flow is transmitted from orifice 92 to square root extractor 94 and from there to multiplier 90. In multiplier 90, the two signals are multiplied to provide a signal proportional to the flow rate of hydrogen chloride to the reactor 6, which signal is transmitted to flow recorder controller 66. A signal proportional to the flow of hydrocarbon reactants to reactor 6 is transmitted from orifice 100 to square root extractor 98 and from there to ratio relay 96 which is adjusted to provide the desired ratio of hydrocarbon-to-HCl entering the reactor. Another signal is transmitted from ratio relay 96 to flow recorder controller 66 which resets this instrument to change the flow of HCl in compensation for changes in hydrocarbon flow rate. Flow recorder controller 66 in turn actuates valve 68 to increase the flow rate of hydrogen chloride recycle gas. It is necessary that the pressure in the system including the surge tank, stripper and hydrogen chloride recycle be maintained substantially constant. This pressure is controlled by pressure recorder controller 84 which bypasses hydrogen chloride recycle gas to the hydrogen chloride stripper feed surge tank 26 in response to the pressure of said gas. Thus, when valve 68 is opened to increase the flow of hydrogen chloride recycle to the reactor, the flow of gases through pressure recorder controller 84 reduces the flow of gases through valve 82 to aid in maintaining the pressure of the hydrogen chloride recycle gas at the desired level.

The preceding discussion has been directed to a preferred embodiment of the invention, however, it is within the scope of the invention to employ other process arrangements and instrumentation within the scope of the invention. Any conventional instruments known to those skilled in the art can be employed in carrying out the invention. Thus, conventional flow recorder controllers, orifices, control valves, etc., can be employed in the various locations in the process flow wherein they are called for. The hydrogen chloride analyzer can be any conventional analyzer, for example, a Davis Continuous Electroconductivity Analyzer manufactured by Davis Instruments, a division of Davis Emergency Equipment Company Inc. This particular instrument combines the hydrogen chloride analyzer 70 and analyzer recorder controller 72. The instruments which are included in a computer control system can include Sorteberg square root extractors, Model B, Type S, which are manufactured by Minneapolis Honeywell (Catalogue C80–1, September 1956), a Sorteberg multiplier, Model B, Type R, also manufactured by Minneapolis Honeywell (Catalogue C80–1, September 1956), a Foxboro ratio relay No. 57 SR, manufactured by the Foxboro Instrument Co. (Bulletin 17–251, April 1956), a Foxboro Model 5412 PX 58P4 recorder controller, also manufactured by the Foxboro Instrument Company (Bulletin 13–18A, July 1956 and Bulletin 463, March 1952), and a Swartwout Autronic Power Relay, manufactured by the Swartwout Co. (Bulletin A–710–B).

The following example is presented in illustration of the invention.

*Example*

| Flows | | Gal./Day |
|---|---|---|
| Hydrocarbon Feed (2) | | 416,200. |
| Composition: | | |
| n-hexane | 63.1 vol. percent. | |
| Methyl cyclopentane | 18.2 vol. percent. | |
| Cyclohexane | 3.8 vol. percent. | |
| Isohexanes | 14.7 vol. percent. | |
| Isoheptanes | 0.2 vol. percent. | |
| Al-Cl₃ complex (3 and 16) | | 299,830. |
| HCl (recycle) to Reactor (52) | | 1,000,000 s.c.f.d. |
| Composition: | | |
| non-condensables | 20% vol. percent (gas). | |
| HCl | 80% vol. percent (gas). | |
| HCl (recycle) to Feed Surge Tank (54) | | 100,000 s.c.f.d. |
| Reactor effluent (12) | | 736,080. |
| Composition: | | |
| non-condensables | 208,100 s.c.f.d. | |
| n-hexane | 16.1 vol. percent. | |
| methyl cyclopentane | 2.3 vol. percent. | |
| Cyclohexane | 9.6 vol. percent. | |
| Isohexanes | 28.3 vol. percent. | |
| Isoheptanes | 0.1 vol. percent. | |
| Catalyst | 40.9 vol. percent. | |
| HCl | 2.7 vol. percent. | |
| Vent Gas (34) | | 9,000 s.c.f.d. |
| Composition: | | |
| non-condensables | 90 vol. percent (gas). | |
| HCl | 10 vol. percent (gas). | |
| Fresh HCl (28) | | 700 lbs./day or 6,900 s.c.f.d. |

| Temperatures | °F. |
|---|---|
| Reactor (6) | 140 |
| HCl Stripper (38): | |
| Top | 150 |
| Bottom | 355 |

| Pressures | p.s.i.g. |
|---|---|
| Reactor (6) | 155 |
| Coalescer (20) | 140 |
| Feed Surge Tank (26) | 135 |
| HCl Stripper (38): | |
| Top | 180 |
| Bottom | 190 |

During the course of operation in accordance with the preceding example, the reaction conditions in reactor 6 are changed such that the composition of the hydrogen chloride stripper overhead increases in non-condensables from 20 percent to 21 percent. The change in concentration of this stream is recorded by hydrogen chloride analyzer 70 which transmits a signal proportional to the hydrogen chloride concentration to analyzer recorder controller 72. This instrument in turn resets flow recorder controller 74 which actuates valve 76 to increase the flow of vent gas through conduit 34 to compensate for the increase in non-condensables. With the increased flow of gases through the vent gas absorber 30, the pressure in the hydrogen chloride stripper feed surge tank is reduced, which actuates pressure recorder controller 78, causing valve 80 to open and introduce fresh hydrogen chloride to the system through conduit 28. Hydrogen chloride analyzer 70 also transmits a signal to the computer control system previously described in connection with the drawing, said system comprising flow recorder controller 66, power relay 60, multiplier 90, flow orifices 92 and 100, square root extractors 94 and 98, and ratio relay 96. The computer control system operates to reset flow recorder controller 66 which in turn actuates control valve 68 to increase the flow of hydrogen chloride recycle to reactor 6 whereby the desired ratio of hydrogen chloride-to-hydrocarbon feed entering the reactor is maintained at the desired level. As long as the quantity of non-condensables in the overhead from hydrogen chloride stripper remains at the increased percentage, the various changes produced by the instrumentation system also persist, namely, (1) increased flow of fresh hydrogen chloride to surge tank 26, (2) increased flow rate of vent gas through gas absorber 30 and (3) increased flow rate of hydrogen chloride recycle to the reactor. When the quantity of non-condensables in the system returns to its previous level, the various process streams which are controlled by the instrumentation system are also returned to their previous values.

Having thus described the invention by providing a specific example thereof, it is to be understood that no undue restrictions or limitations are to be drawn by reason thereof and that many variations and modifications are within the scope of the invention.

I claim:

1. In a process for the isomerization of hydrocarbons with a metal halide catalyst and a hydrogen halide, in which the isomerization reaction effluent is introduced to a surge zone from which non-condensable gases, including hydrogen halide, are vented, material from said surge zone is introduced to a striping zone wherein a gaseous material rich in hydrogen halide is separated, said gaseous material is recycled to the isomerization reaction and fresh hydrogen halide is introduced to the process as makeup, the improvement which comprises measuring the hydrogen halide concentration in the gaseous material recycled to the isomerization zone, controlling the concentration of hydrogen halide in the reaction system and reducing the loss of hydrogen halide in said system by varying the rate at which non-condensable gases are vented from the surge zone in inverse proportion to and in response to variations in said hydrogen halide concentration, measuring the pressure in the surge zone, varying the quantity of fresh hydrogen halide introduced to the process inversely in proportion to and in response to variations in said pressure, measuring the flow rate of hydrocarbon reactant and the flow rate and hydrogen halide concentration of gaseous recycle material to the isomerization reaction and varying the latter flow rate in inverse proportin to and in response to variations in the hydrogen halide concentration in said gaseous material and in direct proportin to and in response to variations in the rate of feed of hydrocarbon reactant to the isomerization reaction.

2. The process of claim 1 in which the hydrocarbon reactant feed comprises a normal acyclic compound and a substitute alicyclic compound.

3. The process of claim 2 in which the hydrocarbon reactant feed comprises normal hexane and methyl cyclopentane.

4. The process of claim 3 in which the catalyst is aluminum chloride and the hydrogen halide is hydrogen chloride.

5. The process of claim 1 in which excess gaseous material concentrated in hydrogen halide is recyled to the stripping surge zone.

6. The process of claim 5 in which the flow rate of gaseous material concentrated in hydrogen halide to the striping surge zone is varied in direct proportion to and response to variations in the pressure of said material.

7. The process of claim 6 in which the hydrocarbon reactant feed comprises normal hexane and methyl cyclopentane, the catalyst is aluminum chloride and the hydrogen halide is hydrogen chloride.

8. In apparatus comprising, in combination, a reactor adapted for the isomerization of hydrocarbons with a metal halide catalyst and a hydrogen halide, conduit means for introducing hydrocarbon feed, metal halide catalyst and hydrogen halide to said reactor, a surge vessel, means for transferring reaction effluent from said reactor to said surge vessel, conduit means for introducing fresh hydrogen halide to said surge vessel, conduit means for venting gases from said surge vessel, a hydrogen halide stripper, conduit means for transferring liquid from said surge vessel to said stripper, conduit means for removing liquid product from said stripper, conduit means for removing vapor product rich in hydrogen halide from said stripper, conduit means for passing said vapor product from said stripper to said reactor, the improvement which comprises a first instrumentation means for measuring the concentration of hydrogen halide in said vapor products, instrumentation means associated with said first instrumentation means for varying the quantity of gas vented from the surge vessel in inverse proportion to and in response to variations in the concentration of hydrogen halide in said vapor product, a second instrumentation means for measuring the pressure in the surge vessel, instrumentation means associated with said second instrumentation means for varying the rate of flow of fresh hydrogen halide to the surge vessel in inverse proprtion and in response to variations in said pressure, third and fourth instrumentation means for measuring respectively the rates of flow of hydrocarbon feed and stripper vapor product to the reactor, instrumentation means associated with said first, third and fourth instrumentation means for varying the rate of flow of stripper vapor product to the reactor in inverse proportion to and in response to variations in the concentration of hydrogen halide in said vapor products and in direct proportion to and in response to variations in the measured rate of flow of the hydrocarbon feed to the reactor.

9. The apparatus of claim 8 in which there are provided conduit means for returning a portion of the stripper vapor product to the surge vessel, fifth instrumentation means for measuring the pressure of the stripper vapor product, and instrumentation means associated with said fifth instrumentation means for varying the flow rate of said vapor product to said vessel in direct proportion to and in response to variations in the pressure of the stripper vapor product.

10. The apparatus of claim 8 in which the instrumentation for measuring the concentration of hydrogen halide in the stripper vapor product is an analyzer which transmits a signal proportional to said concentration to a recorder controller which in turn resets a flow recorder controller, the latter controller actuating a valve in the vent gas conduit means from the surge vessel; the pressure in the surge vessel is sensed by a pressure recorder controller which actuates a valve in the conduit means for introducing fresh hydrogen halide to said surge vessel; the instrumentation means for varying the flow of stripper vapor product to the reactor comprises a multiplier which receives a signal proportional to hydrogen halide concentration in the stripper vapor product from said analyzer, and a signal proportional to flow from an orifice in the conduit means for introducing stripper vapor product to the reactor, a ratio relay set to provide a fixed ratio of hydrocarbon-to-hydrogen chloride which receives a signal from an orifice in the conduit means for introducing hydrocarbon feed to the reactor, and a flow recorder controller which receives a signal from said multiplier and from said ratio relay.

11. The apparatus of claim 9 in which the instrumentation for measuring the concentration of hydrogen halide in the stripper vapor product in an analyzer which transmits a signal proportional to said concentration to a recorder controller which in turn resets a flow recorder controller, the latter controller actuating a valve in the vent gas conduit means from the surge vessel; the pressure in the surge vessel is sensed by a pressure recorder controller which actuates a valve in the conduit means for introducing fresh hydrogen halide to said surge vessel; the instrumentation means for returning stripper vapor product to the surge vessel comprises a pressure recorder controller which senses the pressure of the stripper vapor product and actuates a valve in the conduit means for returning said product to the surge vessel; the instrumentation means for varying the flow of stripper vapor product to the reactor comprises a multiplier which receives a signal proportional to hydrogen halide concentration in the stripper vapor product from said analyzer, and a signal proportional to flow from an orifice in the conduit means for introducing stripper vapor product to the reactor, a ration relay set to provide a fixed ratio of hydrocarbon-to-hydrogen chloride which receives a signal from an orifice in the conduit means for introducing hydrocarbon feed to the reactor, and a flow recorder controller which receives a signal from said multiplier and from said ratio relay.

12. The apparatus of claim 11 in which the analyzer is an instrument adapted to measure hydrogen halide concentration by chromatography.

13. The apparatus of claim 11 in which the analyzer is an instrument adapted to measure hydrogen halide concentration based on the di-electric constant of said hydrogen halide.

14. The apparatus of claim 11 in which the analyzer is an instrument adapted to measure hydrogen halide concentration based on the electrical conductivity of said hydrogen halide.

References Cited in the file of this patent

UNITED STATES PATENTS

| | | |
|---|---|---|
| 2,407,488 | Franklin | Sept. 10, 1946 |
| 2,415,973 | Swearingen | Feb. 18, 1947 |
| 2,518,307 | Groebe | Aug. 8, 1950 |
| 2,709,678 | Berger | May 31, 1955 |
| 2,783,420 | Thompson et al. | Feb. 26, 1957 |
| 2,838,586 | Kratochvil | June 10, 1958 |
| 2,868,701 | Berger | Jan. 13, 1959 |
| 2,893,927 | Mertz et al. | July 7, 1959 |

UNITED STATES PATENT OFFICE
CERTIFICATE OF CORRECTION

Patent No. 2,983,774　　　　　　　　　　　　　　　　May 9, 1961

William H. Thompson

It is hereby certified that error appears in the above numbered patent requiring correction and that the said Letters Patent should read as corrected below.

Column 7, lines 58 and 60, for "proportin", each occurrence, read -- proportion --; column 9, line 3, for "in", second occurrence, read -- is --.

Signed and sealed this 21st day of November 1961.

(SEAL)
Attest:

ERNEST W. SWIDER
Attesting Officer

DAVID L. LADD
Commissioner of Patents
USCOMM-DC